(12) United States Patent
Kinter et al.

(10) Patent No.: US 7,711,926 B2
(45) Date of Patent: May 4, 2010

(54) MAPPING SYSTEM AND METHOD FOR INSTRUCTION SET PROCESSING

(75) Inventors: Ryan C. Kinter, Sunnyvale, CA (US); David A. Courtright, Los Gatos, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 1497 days.

(21) Appl. No.: 09/836,541

(22) Filed: Apr. 18, 2001

(65) Prior Publication Data

US 2002/0156996 A1    Oct. 24, 2002

(51) Int. Cl.
*G06F 9/30* (2006.01)
(52) U.S. Cl. ...................................................... 712/210
(58) Field of Classification Search ................. 712/204, 712/210, 212, 213, 26, 209, 227; 711/125, 711/128, 212, 123; 710/66; 703/26
See application file for complete search history.

(56) References Cited

U.S. PATENT DOCUMENTS

| | | | |
|---|---|---|---|
| 3,631,405 A | 12/1971 | Hoff et al. | |
| 3,794,980 A | 2/1974 | Cogar et al. | |
| 3,811,114 A | 5/1974 | Lemay et al. | |
| 3,840,861 A | 10/1974 | Amdahl et al. | |
| 3,983,541 A | 9/1976 | Faber et al. | |
| 4,110,822 A | 8/1978 | Porter et al. | |
| 4,149,244 A | 4/1979 | Anderson et al. | |
| 4,229,790 A | 10/1980 | Gilliland et al. | |
| 4,295,193 A | 10/1981 | Pomerene | |
| 4,388,682 A | 6/1983 | Eldridge | |
| 4,432,056 A | 2/1984 | Aimura | |
| 4,467,409 A | 8/1984 | Potash et al. | |
| 4,484,268 A | 11/1984 | Thoma et al. | |
| 4,507,728 A | 3/1985 | Sakamoto et al. | |
| 4,685,080 A | 8/1987 | Rhodes, Jr. et al. | |
| 4,724,517 A | 2/1988 | May | |
| 4,777,594 A | 10/1988 | Jones et al. | |
| 4,782,441 A | 11/1988 | Inagami et al. | |
| 4,876,639 A | 10/1989 | Mensch, Jr. | |

(Continued)

FOREIGN PATENT DOCUMENTS

EP    0 073 424 A2    3/1983

(Continued)

OTHER PUBLICATIONS

Morris Chang et al., Designning A Java Microprocessor Core Using FPGA Technology, pp. 13,17, 1998, IEEE.*

(Continued)

*Primary Examiner*—Eric Coleman
(74) *Attorney, Agent, or Firm*—Sterne, Kessler, Goldstein & Fox PLLC

(57) ABSTRACT

A method, cache controller, and computer processor provide a parallel mapping system whereby a plurality of mappers processes several inputs simultaneously. The plurality of mappers are disposed in a pipelined processor upstream from a multiplexor. Mapping, tag comparison, and selection by the multiplexor all occur in a single pipeline stage. Data does not wait idly to be selected by the multiplexor. Instead, each instruction of a first instruction set is read in parallel into a corresponding one of the plurality of mappers. This parallel mapping system implementation reduces processor cycle time and results in improved processor efficiency.

23 Claims, 5 Drawing Sheets

U.S. PATENT DOCUMENTS

| | | | |
|---|---|---|---|
| 5,031,096 | A | 7/1991 | Jen et al. |
| 5,115,500 | A | 5/1992 | Larsen |
| 5,132,898 | A | 7/1992 | Sakamura et al. |
| 5,241,636 | A | 8/1993 | Kohn |
| 5,355,460 | A | 10/1994 | Eickemeyer et al. |
| 5,371,864 | A | 12/1994 | Chuang |
| 5,392,408 | A | 2/1995 | Fitch |
| 5,394,558 | A | 2/1995 | Arakawa et al. |
| 5,396,634 | A | 3/1995 | Zaidi et al. |
| 5,404,472 | A | 4/1995 | Kurosawa et al. |
| 5,475,824 | A | 12/1995 | Grochowski et al. |
| 5,475,853 | A | 12/1995 | Blaner et al. |
| 5,506,974 | A | 4/1996 | Church et al. |
| 5,539,680 | A * | 7/1996 | Palnitkar et al. ............ 703/13 |
| 5,542,060 | A | 7/1996 | Yoshida |
| 5,568,646 | A | 10/1996 | Jaggar |
| 5,574,873 | A | 11/1996 | Davidian |
| 5,574,941 | A | 11/1996 | Horst |
| 5,581,718 | A | 12/1996 | Grochowski |
| 5,619,667 | A | 4/1997 | Henry et al. |
| 5,664,136 | A | 9/1997 | Witt et al. |
| 5,732,234 | A | 3/1998 | Vassiliadis et al. |
| 5,740,392 | A * | 4/1998 | Brennan .................... 712/210 |
| 5,740,461 | A | 4/1998 | Jaggar |
| 5,796,973 | A | 8/1998 | Witt et al. |
| 5,954,830 | A | 9/1999 | Ternullo, Jr. |
| 6,021,265 | A | 2/2000 | Nevill |
| 6,049,863 | A * | 4/2000 | Tran et al. .................. 712/213 |
| 6,199,154 | B1 * | 3/2001 | Witt ......................... 712/205 |
| 6,266,765 | B1 | 7/2001 | Horst |
| 6,272,620 | B1 | 8/2001 | Kawasaki et al. |
| 6,442,674 | B1 * | 8/2002 | Lee et al. ................... 712/205 |
| 6,584,558 | B2 * | 6/2003 | Hammond et al. ......... 712/244 |
| 6,651,160 | B1 | 11/2003 | Hays |
| 6,952,754 | B2 * | 10/2005 | O'Connor et al. .......... 711/125 |
| 7,069,420 | B1 * | 6/2006 | Overkamp et al. ......... 712/208 |
| 2001/0021970 | A1 | 9/2001 | Hotta et al. |
| 2002/0107678 | A1 * | 8/2002 | Wu et al. .................... 703/14 |
| 2004/0054872 | A1 | 3/2004 | Nguyen et al. |

FOREIGN PATENT DOCUMENTS

| | | |
|---|---|---|
| EP | 0 109 567 A2 | 5/1984 |
| EP | 0 170 398 A2 | 2/1986 |
| EP | 0 239 081 B1 | 9/1995 |
| EP | 0 449 661 B1 | 11/1995 |
| EP | 0 324 308 B1 | 3/1996 |
| EP | 0 368 332 B1 | 9/1997 |
| GB | 2 016 755 A | 9/1979 |
| WO | WO 95/30187 A1 | 11/1995 |

OTHER PUBLICATIONS

Hirata, H., et al., "An Elementary Processor Architecture with Simultaneous Instruction Issuing from Multiple Threads," ACM SIGARCH Computer Architecture News, vol. 20, No. 2, pp. 136-145, Association for Computing Machinery (May 1992).

Reissue U.S. Appl. No. 10/066,475, inventor Edward Colles Nevill, filed Feb. 1, 2002 (based on U.S. Pat. No. 6,021,265, issued Feb. 1, 2000) (9 pages).

Preliminary Amendment, filed Feb. 1, 2002, in Reissue U.S. Appl. No. 10/066,475, inventor Edward Colles Nevill, filed Feb. 1, 2002 (based on U.S. Pat. No. 6,021,265, issued Feb. 1, 2000) (15 pages).

Case, Brian, "ARM Architecture Offers High Code Density: Non-Traditional RISC Encodes Many Options in Each Instruction," *Microprocessor Report*, vol. 5, No. 23, pp. 11-14 (Dec. 18, 1991).

Cobb, Paul, "TinyRISC: a MIPS-16 embedded CPU core," Presentation for Microprocessor Forum, 13 slides (7 pages) (Oct. 22-23, 1996).

Gwennap, Linley, "VLIW: The Wave of the Future?: Processor Design Style Could Be Faster, Cheaper Than RISC," *Microprocessor Report*, vol. 8, No. 2, pp. 18-21 (Feb. 14, 1994).

Kurosawa, K., et al., "Instruction Architecture For A High Performance Integrated Prolog Processor IPP," *Logic Programming: Proceedings of the Fifth International Conference and Symposium* (Aug. 15-19, 1988), MIT Press, Cambridge, MA, vol. 2, pp. 1506-1530 (1988).

NEC Data Sheet, MOS Integrated Circuit, uPD30121, VR4121 64-/32-Bit Microprocessor (Copyright NEC Electronics Corporation 2000) (76 pages).

NEC User's Manual, VR4100 Series™, 64-/32-Bit Microprocessor Architecture, pp. 1-11 and 54-83 (Chapter 3) (Copyright NEC Corporation 2002).

NEC User's Manual, VR4121™, 64/32-Bit Microprocessor, uPD30121, pp. 1-19 and 103-131 (Chapter 4) (Copyright NEC Corporation 1998).

Ross, Roger, "There's no risk in the future for RISC," *Computer Design*, vol. 28, No. 22, pp. 73-75 (Nov. 13, 1989).

* cited by examiner

Serial Mapping System

Parallel Mapping System

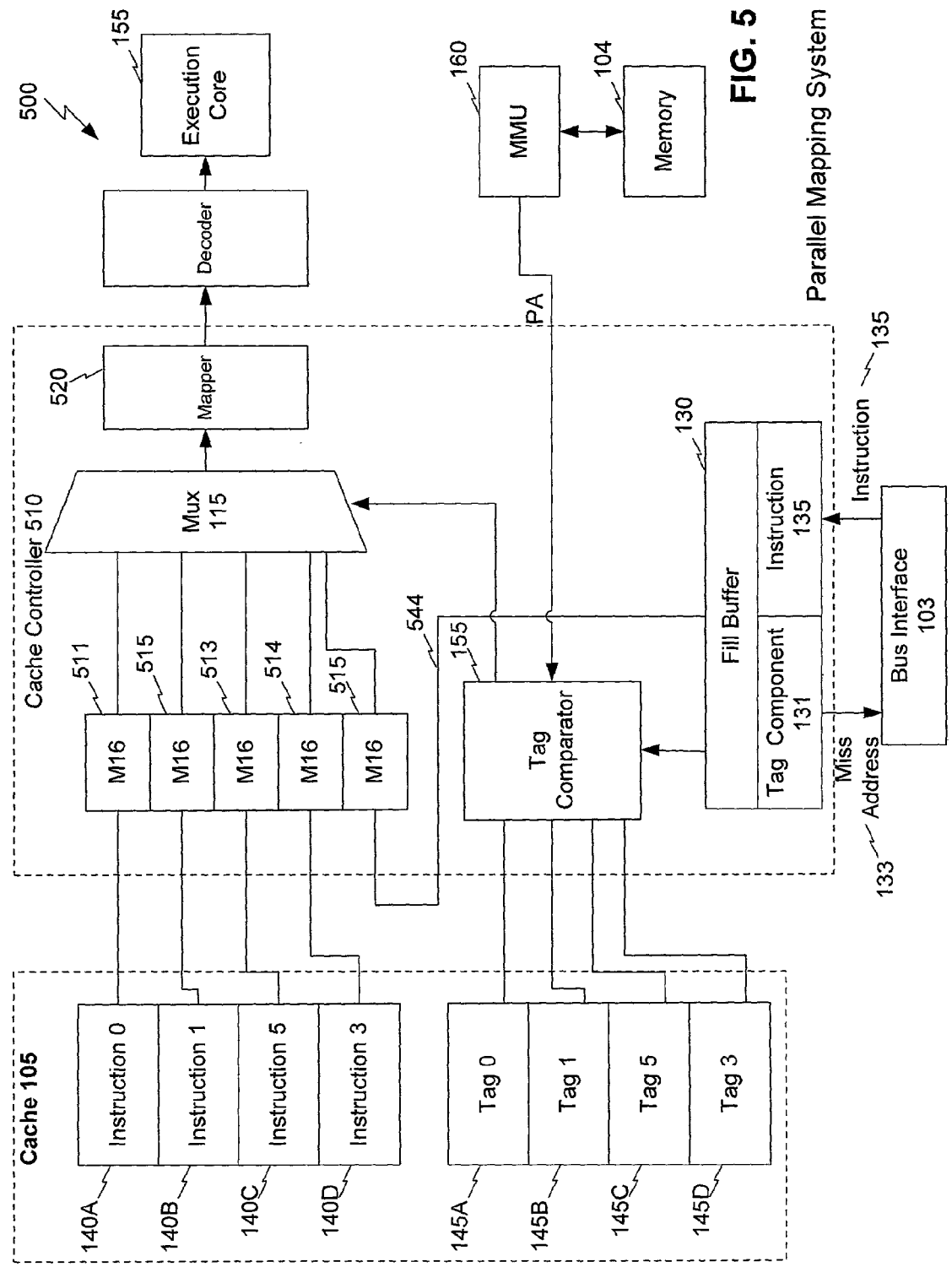

MAPPING SYSTEM AND METHOD FOR INSTRUCTION SET PROCESSING

BACKGROUND OF THE INVENTION

1. Field of the Invention

The present invention relates generally to computer architecture, and more specifically to a processor capable of executing instructions from multiple instruction sets.

2. Background Art

It is well known that computer systems (e.g., main frames, personal computers, microprocessors, etc.) may be designed to execute instructions from more than one instruction set. In such a situation, for example, a first instruction set might be optimized for fast execution on a target system. However, instructions from this first set might have a relatively wide format (e.g., 32 or 64 bits in width) and therefore use a relatively large amount of memory space for storage. Hence, a second instruction set could be made available that is optimized for using less memory space through the use of a narrower instruction width format (e.g., 8 or 16 bits in width). Such instructions may execute routines slower than those from the first instruction set (because more and possibly different instructions are required to carry out the same function), but the narrower format contributes to a potential reduction in overall memory space required. Additionally, a third instruction set could be made available to provide backwards compatibility to earlier generation machines that, again, may utilize instruction width formats of differing size (e.g., older 16-bit machines). Moreover, a fourth (or more) instruction set could be made available to provide upwards compatibility to new developments in instruction sets that may also require different instruction width formats (e.g., 8-bit JAVA bytecodes). The foregoing examples, of course, are not exhaustive.

In order for a single computer system to support two or more instruction sets as described above, the system requires the capability to accommodate different instruction width formats. Such capability may be achieved by mapping one instruction set onto another, which thereby necessitates only a single decoder for such different formats. Such mapping is possible where the one instruction set is a subset of the other. However, this is a significantly limiting feature since most instruction sets are not so related.

Moreover, this issue is made more complex in computer systems using multi-way caches that simultaneously output a plurality of instructions to select from. Mapping may be achieved in such a system through a series of operations carried out in one or more pipeline stages (of a pipelined processor). These operations include reading a plurality of instructions from a cache memory, and processing such instructions by tag comparing each instruction, selecting a desired instruction from the plurality (based on the tag compare) and then mapping the desired instruction. However, in such a serial method, the processing of these instructions results in a branch penalty and/or increased cycle time.

Therefore, what is needed is a more efficient and flexible mechanism for mapping instructions of a plurality of instruction sets for execution on a single computer system.

BRIEF SUMMARY OF THE INVENTION

The present invention provides a method, cache controller, and processor for employing an instruction set mapping system for improving the efficiency and flexibility of a processor. The present invention provides a parallel mapping system in which a plurality of mappers are located upstream from a multiplexor. Instead of having instructions sit idly while waiting on multiplexor selection, each instruction of a first instruction set is read in parallel into a corresponding one of a plurality of mappers. While each instruction of the first instruction set is being mapped to a predetermined instruction width format (PIWF) configuration, a tag compare device is simultaneously comparing each tag corresponding to one of the first instructions with the tag associated with the address of the instruction being sought. The address being sought is generated by a Memory Management Unit (MMU).

The tag compare device compares each tag having an associated data component in cache memory with the address being sought to determine if the cache contains a "hit." If there is not a hit, the instruction of the address being sought is read from main memory. If there is a hit in the cache, the tag comparison device transmits a signal to the multiplexor indicating which of the mapped instructions is the "desired" instruction.

The multiplexor then selects the desired instruction and transmits it downstream to the execution core. The system reduces processor cycle time and results in improved performance of the processor.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 5 is a block diagram illustrating the system architecture of a parallel mapping system utilized in an alternate embodiment of the present invention.

DETAILED DESCRIPTION OF THE INVENTION

The present invention is described in the environment of a processor that maps instructions of a first instruction set to a predetermined instruction width format ("PIWF") that is sufficiently wide to, and does, accommodate two or more instruction sets. In a first embodiment, the PIWF is wider than the instruction width formats of the plurality of instructions sets supported by the host computer system. The extra width may be used to support functionality that is unique and exclusive to each respective instruction set. That is, a first instruction set may have unique functionality not available in one or more other instruction sets. Further, a second instruction set may have unique functionality that is not available in the first instruction set.

In a second embodiment, the PIWF is the same width as at least one of the instruction width formats of the instruction sets supported by the computer system. In this embodiment, the PIWF could be identical to one of the supported instruction sets. For example, if one of the supported instruction sets has an instruction width of 32 bits, the PIWF would be identical to such set if the PIWF also had a width of 32 bits and had the same encoding (with no additions or deletions) as the supported instruction set.

The PIWF is a format with a sufficient number of bits to provide a corresponding representation for each instruction in the plurality of instruction sets supported by the host computer system. Each instruction in the plurality of instruction sets is mapped to a PIWF configuration representing that instruction. The PIWF may itself be an instruction set (if identical to a supported instruction set) or it may be an intermediate instruction representation (if different from all the supported instructions sets). In either case, a decoder is required to decode the PIWF for execution by a processor core.

In an exemplary embodiment described below, 16-bit instructions are mapped to a 34-bit PIWF configuration that supports 16-bit and 32-bit instructions. However, in alternative embodiments, the PIWF may have fewer or more than 34 bits. This environment is used for purposes of illustration. The invention, however, is not so limited. A person skilled in the art will recognize that the invention has applicability for mapping instructions (or, more generically, "data") from any first format to any PIWF configuration. Additionally, although not discussed below, each 32-bit instruction in the exemplary embodiment must also be mapped to a PIWF configuration. This may be achieved through a mapper scheme (as described below), bit stuffing, or any other mapping method known to those skilled in the art.

Figure 1:
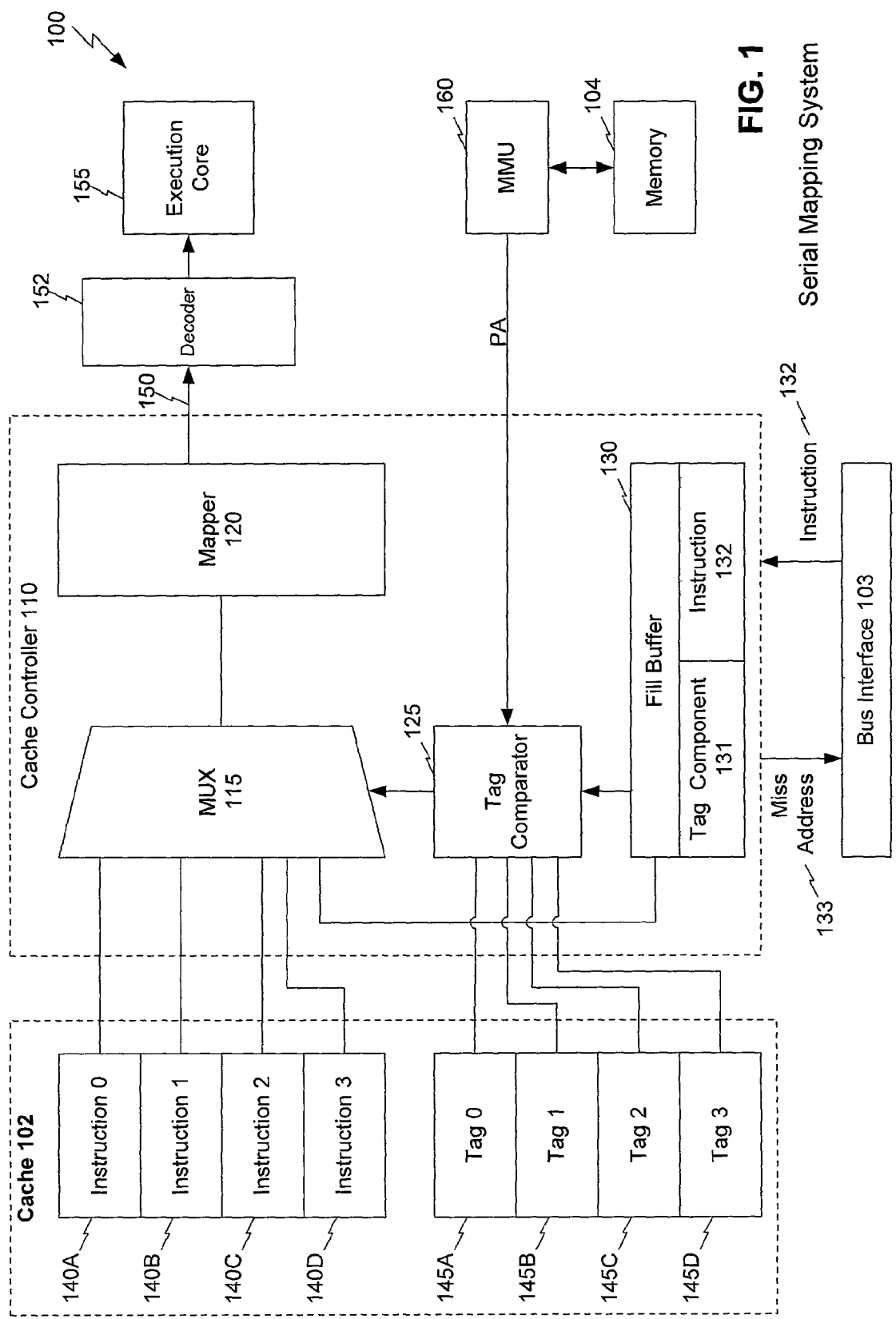
FIG. 1 is a block diagram illustrating the system architecture of a traditional serial mapping system.

The invention is now described with reference to FIGS. 1-5. Referring first to FIG. 1, the system architecture of a traditional serial mapping system utilized by a processor executing a computer instruction fetch operation is shown. As an example, consider a read operation executed by a processor or central processing unit (CPU) 100. In a typical read operation executed by CPU 100, a cache set is accessed from a cache memory 102 by a cache controller 110.

In this example, each cache set is comprised of a set of sixteen byte fields or lines plus respective tag components. In this example, the cache set includes four cache lines. Each cache line comprises a data component 140A-D and a tag component 145A-D. For example, data component 140A and its corresponding tag component 145A combine to form one cache line. Data component 140B and tag component 145B combine to form a second cache line. Data component 140C and tag component 145C combine to form a third cache line. Data component 140D and tag component 145D combine to form a fourth cache line. This configuration is present for each line in the cache.

In each data component 140 of a cache line, an instruction is stored, i.e. an opcode value and operand description. Thus, for example, data component 140A contains instruction 0. Data component 140B contains instruction 1; data component 140C contains instruction 2; data component 140D contains instruction 3, and so forth. Note, however, that instructions in multiple lines of the same set (i.e., instructions 0-3) are not sequential instructions. The numbering convention 0, 1, 2 and 3 is used simply for convenience and does not imply an ordering.

Memory Management Unit (MMU) 160 generates a sought address. A tag component of the sought address is used to determine if the instruction being sought is actually stored in cache memory 102. If the instruction sought resides in cache memory 102, the cache is said to contain a "hit." If not, a miss occurs and the instruction sought must be read into cache memory 102 from main memory 104.

For example, tag component 145A contains tag 0. Tag 0 represents the tag associated with instruction 0, stored in data component 140A; tag 1 represents the tag associated with instruction 1, stored in data component 140B; tag 2 represents the tag associated with instruction 2, stored in data component 140C; and tag 3 represents the tag associated with instruction 3, stored in data component 140D, etc.

As explained above, each sixteen bit instruction must be mapped to a PIWF configuration. To accomplish this mapping feature, the cache controller 110 of the serial mapping system depicted in FIG. 1 contains a mapper 120 for mapping each instruction of a first instruction set to a corresponding PIWF configuration; a multiplexor 115; and a tag comparator 125.

Continuing with the example of the read operation, the cache line comprising data component 140A and tag component 145A is accessed. Instruction 0, stored in data component 140A is read into multiplexer 115. Likewise, instruction 1, stored in data component 140B is read into multiplexor 115. Instruction 2, stored in data component 140C is read into multiplexor 115. Instruction 3, stored in data component 140D is read into multiplexor 115, and so forth.

Tag comparator 125 performs a tag comparison operation on all of the tags stored in the tag components 145. More specifically, tag comparator 125 compares tag 0, associated with instruction 0, to the address generated by MMU 160, the "sought address." Likewise, tag comparator 125 compares tag 1, associated with instruction 1, to the tag of the sought address. Tag comparator 125 compares tag 2, associated with instruction 2, to the tag of the sought address. Tag comparator 125 compares tag 3, associated with instruction 3, to the tag of the sought address. These tag comparison operations are executed in parallel.

If the tag of the sought address does not match any of the tags associated with the instructions stored in data components 140 of the cache memory, the cache does not contain a hit, and the value sought must be read from main memory. If the tag of the sought address matches a tag associated with any data stored in any particular cache line, the cache contains a hit.

For example, if the sought address is equal to tag 2, the cache contains a hit because tag 2 is the value stored in tag component 145C, which is associated with data component 140C. Thus, instruction 2, stored in data component 140C, is the desired instruction because its associated tag, tag 2, matches the tag of the sought address.

Tag comparator 125 then transmits an indicator signal to multiplexor 115 to select the desired instruction. Multiplexor 115 then selects the desired instruction. In the above referenced example, where the tag comparison device located instruction 2, the desired instruction, tag comparator 125 transmits an indication to multiplexor 115 to select instruction 2.

Multiplexor 115 receives the indicator signal from tag comparator 125, selects the desired instruction, and then transmits the desired instruction to mapper 120. Mapper 120 maps the desired instruction of the first instruction set to a PIWF configuration and transmits a mapped instruction 150 to a decoder 152. Decoder 152 decodes the mapped instruction and provides control signals to execution core 155 for execution.

In one embodiment, fill buffer 130 is present and serves as a staging point for cache memory. Fill buffer 130 comprises a tag component 131 and its associated data component or instruction 132. If the processor determines that there was a "miss" upon reading instruction cache 102, the processor accesses bus interface 103 to obtain instruction 132 from memory 104 (interconnection of bus interface 103 and memory 104 not shown). The processor supplies the memory address 133 of the instruction that was not identified in the cache memory 102 to memory 104 via bus interface 103.

Next, just as a cache line is accessed upon the data read operation, fill buffer 130 is accessed. Tag 131 of fill buffer 130 is compared to the tag of the sought address. If there is a hit, tag comparator 125 transmits a signal to multiplexor 125 to select data 132 because its associated tag 131 was the hit. Multiplexor 125 then passes the selected instruction to be processed to mapper 120 and transmits it downstream to the execution core, just as if the selected instruction had been stored in cache memory.

The term "downstream" is used throughout this document to reference the direction that data flows through processor 100 over time (i.e., heading away from the cache controller to the execution core, etc.). Thus, the term "upstream" is used to reference the reverse direction (i.e., heading away from the execution core to the cache controller).

Figure 2:
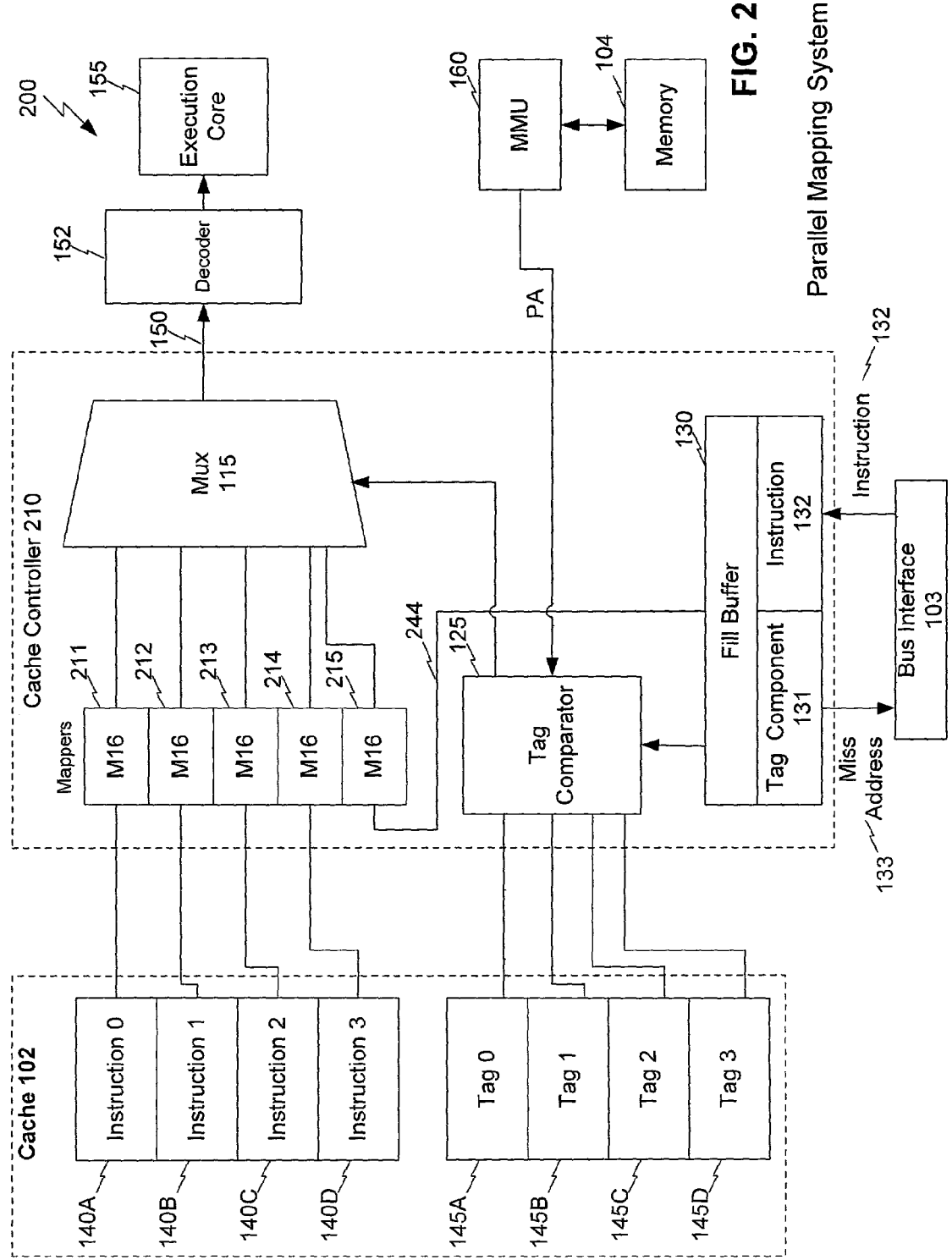
FIG. 2 is a block diagram illustrating the system architecture of a parallel mapping system utilized in the present invention.

FIG. 2 illustrates the system architecture of a parallel mapping system utilized by a CPU or processor 200 initiating a computer instruction fetch operation. In a typical read operation executed by CPU 200, a cache set is accessed by cache controller 210. Each cache set is comprised of four sixteen byte lines or fields plus respective tag components. Each cache line comprises a data component and a tag component, as described above.

Instruction fetch begins as described above with respect to FIG. 1. However, the mapping and selection processes are different. Continuing with the example of the read operation, each of the data components 140 is read in parallel into a corresponding one of a plurality of mappers 211-214. For example, instruction 0 stored in data component 140A is read into corresponding mapper 211. Simultaneously, instruction 1 stored in data component 140B is read into corresponding mapper 212. Instruction 2, stored in data component 140C, is simultaneously read into corresponding mapper 213. Instruction 3 stored in data component 140D is simultaneously read into mapper 214. As further described below, an instruction is provided to mapper 215 via line 244. Thus, each instruction of a first instruction set stored in cache memory 102 is read into a corresponding one of the plurality of mappers 211-214 in parallel. Each of the plurality of mappers 211-214 maps an instruction of a first instruction set to a PIWF configuration. Each of the mapped instructions is then provided to multiplexor 115 for selection.

In parallel with the mapping operation, tag comparator 125 performs a tag comparison operation on all of the tags stored in tag components 145. More specifically, tag comparator 125 compares tag 0, associated with instruction 0, to the tag of the sought address. Likewise, tag comparator 125 compares tag 1, associated with instruction 1, to the tag of the sought address. Tag comparator 125 compares tag 2, associated with instruction 2, to the tag of the sought address. Tag comparator 125 compares tag 3, associated with instruction 3, to the tag of the sought address. These tag comparison operations continue until the tag associated with the last line of data in the cache is compared to the tag of the sought address.

If the tag of the sought address does not match any of the tags associated with the instructions stored in the cache lines, the cache does not contain a hit, and the value sought must be read from main memory.

If the tag of the sought address matches the tag associated with the instruction stored in any particular cache line, the cache contains a hit. For example, if the tag of the sought address is tag 2, the cache contains a hit because tag 2 is the value stored in tag component 145C, which is associated with data component 140C. Thus, instruction 2, stored in data component 140C, is the desired instruction because its associated tag, tag 2, matches the tag associated with the instruction sought.

Tag comparator 125 provides an indicator signal to multiplexor 115 to select the value located in the cache (i.e., the desired instruction). Multiplexor 115 then selects the desired instruction. In the above referenced example, where tag comparator 125 identified instruction 2, the desired instruction, tag comparator 125 transmits an indicator signal to multiplexor 115 to select instruction 2.

Multiplexor 115 selects the desired instruction and transmits the selected instruction to the execution core for further processing (i.e., for instruction decoding and execution).

It should be noted that the operations of mapping, tag comparing, and selecting a desired instruction each occur in a single pipeline stage in the present invention. By performing tag comparison in parallel with mapping, processing time is improved.

In one embodiment, fill buffer 130 is present and serves as a staging point for cache memory 102. Fill buffer 130 comprises a tag component 131 and its associated data component 132. If the processor determines that there was a "miss" upon reading instruction cache 102, the processor accesses bus interface 103 to obtain instruction 132 from memory 104 (interconnection of bus interface 103 and memory 104 not shown). The processor supplies the memory address of the instruction that was not identified in the cache memory 102 to memory 104 via bus interface 103. Next, just as a cache line is accessed upon the data read operation, fill buffer 130 is accessed. Thus, data 132 is read into corresponding mapper 215. Data component 132, containing an instruction, is then mapped to a PIWF configuration.

Tag comparator 125 compares tag 131 of fill buffer 130 to the tag of the sought address. If there is a hit, tag comparator 125 transmits a signal to multiplexor 115. Multiplexor 115 then selects data 132 if its associated tag 131 is the hit. Multiplexor 115 then passes the selected instruction to be processed downstream to the execution core, just as if the instruction was stored in a cache line of cache 102.

Figure 3:
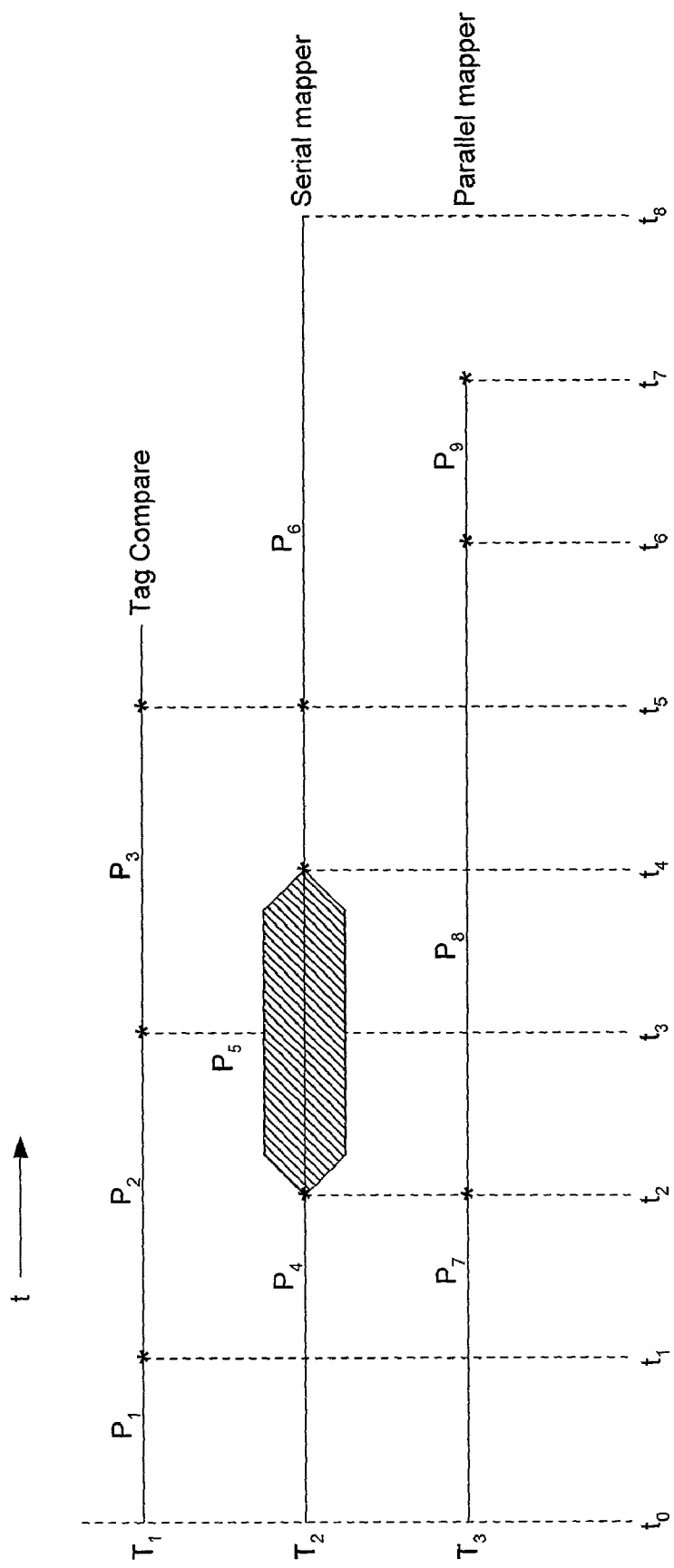
FIG. 3 is a timing diagram depicting a comparison of time in the system of FIG. 1 with that of FIG. 2.

FIG. 3 is a timing diagram comparing timing of the serial system (processor 100) in FIG. 1 with timing of the parallel system (processor 200) of FIG. 2. FIG. 3 shows three time lines, T1, T2, and T3. Time line T1 illustrates the timing tag comparison by tag comparator 125. Time line T2 illustrates the timing of instruction fetch and mapping operations by cache controller 110 of processor 100 (i.e., the serial system). Time line T3 illustrates the timing of instruction fetch and mapping operations by cache controller 210 of processor 200 (i.e., the parallel system).

Referring now to time line T1, a tag of an instruction is fetched during period P1 (between $t_0$ and $t_1$). Tag comparison then occurs during period P2 (between $t_1$ and $t_3$). During period P3 (between $t_3$ and $t_5$), instruction selection occurs. That is, during period P3, comparator 125 produces the select signal and provides it to multiplexor 115. Note that the data path through multiplexor 115 is much faster than the select path through comparator 125. If data arrives at multiplexor 115 prior to arrival of the select signal, the data will wait for the select signal.

Referring now to time line T2 (illustrating the timing of instruction fetch and mapping operations in the serial system), note that the data or instructions are fetched during period P4 (between $t_0$ and $t_2$). Then, during period P5 (between $t_2$ and $t_4$), selection by multiplexor 115 awaits completion of tag comparison at period P2. Eventually, the select signal is generated at time $t_5$ and selection occurs. Mapping then occurs during period P6 (between $t_5$ and $t_8$) and ends by time $t_8$.

In contrast to time line T2, note the absence of a wait state in time line T3. In time line T3 (illustrating the timing of instruction fetch and mapping operations in the parallel system), data or instructions are fetched during period P7 (between $t_0$ and $t_2$). Then, during period P8 (between $t_2$ and $t_6$), mapping occurs. Note that mapping occurs substantially in parallel with tag comparison. Thus, while tag comparison is being done, mapping is also being done. Mapping may complete before or after tag comparison is complete.

In the example depicted in FIG. 3, mapping ends at time $t_6$ after completion of tag comparison. After mapping is complete, the select signal is used during a period P9 (between $t_6$ and $t_7$) to select the appropriate data/instruction fed to multiplexor 115. As illustrated, time line T3 is shorter than T2. Because of the wait period P5 in the serial system, valuable time is wasted while the system waits for the tag comparison operation to complete. The time saved by the parallel system of the invention is illustrated in FIG. 3 as the difference in time between $t_7$ and $t_8$. This time can be significant.

Figure 4:
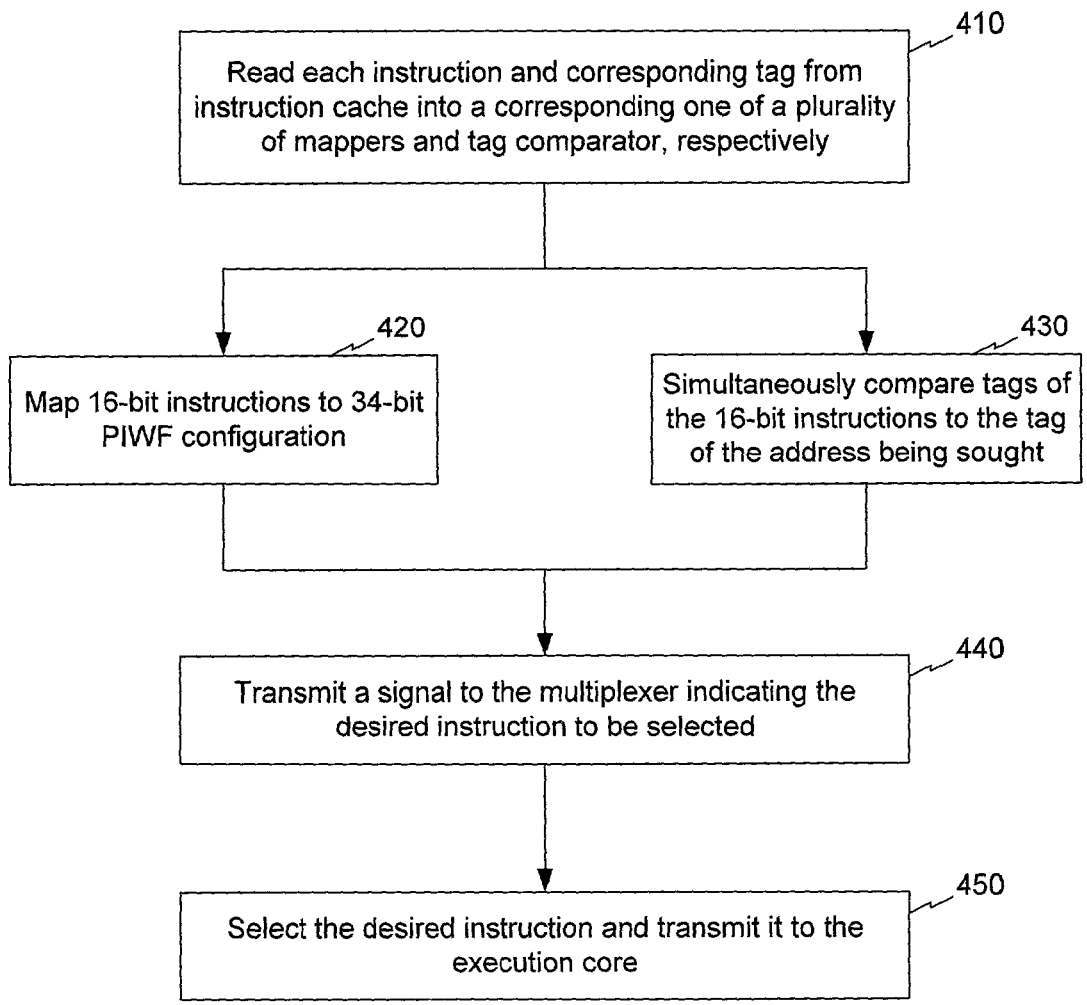
FIG. 4 is a flowchart representing the general operational flow of the steps executed in the parallel mapping system of the present invention.

FIG. 4 is a flowchart representing the general operational flow of the steps executed in the parallel mapping system of the present invention. In a step 410, each sixteen bit instruction and its corresponding tag of the first instruction set is read from the instruction cache into a corresponding one of a plurality of mappers and tag comparator, respectively. In a step 420, each sixteen bit instruction of the first instruction set is mapped to a 34-bit PIWF configuration. In a step 430, while the mapping of step 420 is occurring, the tag comparator compares a tag of each sixteen bit instruction to the tag of the address being sought. In a step 440, the tag comparator transmits a signal to the multiplexor indicating the desired instruction to be selected. In step 450, the multiplexor selects the desired instruction and transmits it to the execution core.

FIG. 5 depicts an alternate embodiment of the present invention. Specifically, FIG. 5 shows a CPU 500 that is substantially identical to CPU 200 of FIG. 2. However, mappers 211-215 of FIG. 2 have been replaced with partial mappers 511-515 in FIG. 5. Furthermore, a mapper 520 has been added to FIG. 5.

Each of partial mappers 511-515 maps only a portion of an instruction to a portion of a mapped instruction of a PIWF configuration. For example, the mapped portion may be only the portion necessary to identify operand registers. Other, less time critical, mapping can occur later. The partially mapped instructions are then provide to multiplexor 115 for selection. Once the desired instruction is selected, mapper 520 completes the task of mapping the remainder of the selected instruction to a PIWF configuration.

An advantage of this partial-mapping embodiment of the invention is that each of partial mappers 511-515 can be implemented in silicon so that it occupies only a fraction of the area required to implement a full mapper. This can result in a savings of total area required to implement the mapper function as compared with the previously described embodiment which requires five full mappers.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention.

For example, in addition to mapping system implementations using hardware (e.g., within a microprocessor or microcontroller), implementations also may be embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C or C++), hardware description languages (HDL) including Verilog HDL, VHDL, and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

It is understood that the functions accomplished and/or structure provided by the systems and techniques described above can be represented in a core (e.g., a microprocessor core) that is embodied in program code and may be transformed to hardware as part of the production of integrated circuits. Also, the system and techniques may be embodied as a combination of hardware and software. Thus, the present invention should not be limited by any of the above-described exemplary embodiments, but should be defined only in accordance with the following claims and their equivalents.

What is claimed is:

1. A cache controller for use with a processor, comprising:
a plurality of mappers for receiving instructions of an instruction set, each mapper for mapping an instruction of said instruction set to a predetermined instruction width format (PIWF) configuration, wherein said plurality of mappers include
at least one first mapper for receiving instructions from a fill buffer, and
at least one second mapper for receiving instructions from an instruction cache;
a multiplexor for receiving said PIWF configurations from said plurality of mappers and selecting, in response to a selector signal, a desired one of said PIWF configurations for decoding and execution by the processor; and
a decoder for decoding the desired one of said PIWF configurations for execution by the processor.

2. The cache controller of claim 1, further comprising:
a tag comparator for generating said selector signal.

3. The cache controller of claim 2, wherein said tag comparator comprises:
a comparer that compares each instruction provided to one of said plurality of mappers with a tag associated with an instruction of said instruction set to a desired tag and generate said selector signal to cause said multiplexor to select said desired one of said PIWF configurations based on the comparison.

4. A method for mapping an instruction set to a predetermined instruction width format (PIWF) configuration, comprising:
(a) reading instructions of said instruction set from an instruction cache and a fill buffer into a plurality of mappers, wherein at least one of said instructions is read from said instruction cache and at least one of said instructions is read from said fill buffer, each instruction of said instruction set being read into a corresponding one of said plurality of mappers in preparation for mapping;
(b) mapping each instruction of said instruction set to a corresponding PIWF configuration;

(c) selecting a desired one of said corresponding PIWF configurations, after said mapping, for decoding and execution by the processor; and (d) decoding the desired one of said PIWF configurations for execution by the processor.

5. The method of claim 4, further comprising:

(e) comparing, for each instruction provided to one of said plurality of mappers, a tag associated with an instruction of said instruction set to a desired tag, wherein said desired one of said PIWF configurations is selected based on said comparison.

6. A processor comprising:
an execution unit;
a decoder;
a cache for storing instructions; and
a cache controller for retrieving said instructions from said cache and providing said instructions to said decoder, said cache controller comprising:
a plurality of mappers for mapping a plurality of instructions of an instruction set to predetermined instruction width format (PIWF) configurations said plurality of mappers including at least one first mapper for receiving instructions from a fill buffer, and at least one second mapper for receiving instructions from said instruction cache,
a multiplexor for selecting and receiving, in response to a selector signal, one of said PIWF configurations from said plurality of mappers for decoding by said decoder and execution by said execution unit, and
a comparer that compares each instruction provided to said multiplexor with a tag associated with an instruction of said instruction set to a desired tag and generate said selector signal to cause said multiplexor to select said desired one of said PIWF configurations,
whereby said processor performs instruction mapping substantially in parallel with tag comparison to improve processor performance, and
whereby said decoder decodes the desired one of said PIWF configurations for execution by the processor based on the comparison.

7. A computer readable storage medium having embodied thereon computer readable program code for providing a microprocessor core, including a cache controller, the computer readable program code comprising:
first computer readable program code for providing a plurality of mappers for receiving instructions of an instruction set, each mapper for mapping an instruction of said instruction set to a predetermined instruction width format (PIWF) configuration, wherein said plurality of mappers include
at least one first mapper for receiving instructions from a fill buffer, and
at least one second mapper for receiving instructions from an instruction cache;
second computer readable program code for providing a multiplexor for receiving said PIWF configurations from said plurality of mappers and selecting, in response to a selector signal, a desired one of said PIWF configurations for decoding and execution by said microprocessor core, and
third computer readable program code for decoding the desired one of said PIWF configurations for execution by the processor.

8. The computer program product of claim 7, further comprising:
fourth computer readable program code for providing a tag comparator, configured to compare, for each instruction provided to one of said plurality of mappers, a tag associated with an instruction of said instruction set to a desired tag and to generate said selector signal to cause said multiplexor to select said desired one of said PIWF configurations.

9. The computer program product of claim 7, wherein the computer readable program code is embodied in hardware description language software.

10. The computer program product of claim 9, wherein the computer readable program code is embodied in Verilog hardware description language software.

11. The computer program product of claim 9, wherein the computer readable program code is embodied in VHDL hardware description language software.

12. A method for decoding instructions in a processor, comprising:
(a) mapping each of a plurality of instructions to a predetermined instruction width format (PIWF) configuration;
(b) comparing, in parallel with (a), a tag for each of said plurality of instructions to an address, wherein each instruction is associated with a unique tag;
(c) selecting, based on the comparison in (b), one of the PIWF configurations of (a) to be decoded; and
(d) decoding the PIWF configuration selected in (c) for execution by a processor core.

13. The method of claim 12, wherein (a) comprises mapping a plurality of 16-bit instructions to a plurality of PIWF configurations.

14. The method of claim 12, wherein (a) comprises mapping a plurality of 32-bit instructions to a plurality of PIWF configurations.

15. The method of claim 12, wherein (a) comprises mapping an instruction from a fill buffer to a PIWF configuration.

16. The method of claim 12, wherein (a) comprises mapping a 16-bit instruction to a PIWF configuration that has more than 32-bits.

17. The method of claim 12, wherein (a) comprises mapping a 32-bit instruction to a PIWF configuration that has more than 32-bits.

18. The method of claim 12, wherein (a) comprises performing a first partial mapping in parallel with (b), and performing a second partial mapping after (c).

19. A cache controller for use with a processor, comprising:
a mapper for mapping each of a plurality of instructions to a predetermined instruction width format (PIWF) configuration;
a multiplexor for receiving said PIWF configurations from said mapper and for selecting, based on a unique tag associated with each of said plurality of instructions, in response to a selector signal, a desired one of said PIWF configurations for decoding and execution by the processor; and
a decoder for decoding the desired one of said PIWF configurations for execution by the processor.

20. The cache controller of claim 19, wherein said mapper maps an instruction from a fill buffer to a PIWF configuration.

21. A computer readable storage medium comprising a microprocessor core embodied in software, said microprocessor core including a cache controller comprising:
a plurality of mappers for receiving instructions of an instruction set, each mapper for mapping an instruction of said instruction set to a predetermined instruction width format (PIWF) configuration, wherein said plurality of mappers include:
at least one first mapper for receiving instructions from a fill buffer, and at least one second mapper for receiving instructions from an instruction cache;

a multiplexor for receiving said PIWF configurations from said plurality of mappers and selecting, in response to a selector signal, a desired one of said PIWF configurations for decoding and execution by said microprocessor core, wherein the tangible computer readable storage medium consisting of at least one of a semiconductor disk, a magnetic disk and an optical disk; and a decoder for decoding the desired one of said PIWF configurations for execution by the processor.

22. A pipelined computer system that supports two or more instruction sets, the computer system comprising:

a cache memory adapted to output a plurality of instructions, wherein each instruction is associated with one of the instruction sets;

a cache controller having a parallel mapper to map each of the plurality of instructions into a predetermined instruction width format;

a tag comparator to compare a tag associated with each instruction in the plurality of instructions with a tag associated with a sought after address concurrently with the mapper mapping the plurality of instructions into the predetermined instruction width format; and a selection circuit to select one of the mapped instructions for decoding, wherein the parallel mapper is disposed in the pipelined computer system upstream from the selection circuit, and wherein the parallel mapping, tag comparison, and selection are completed in a single pipeline stage; and a decoder for decoding the selected mapped instruction for execution by a processor.

23. The pipelined computer system of claim 22, further comprising a fill buffer for holding an instruction retrieved upon a cache miss, the instruction in the fill buffer being associated with one of the instruction sets and having a tag associated therewith, wherein the parallel mapper maps the instruction held in the fill buffer to the predetermined instruction width format, the tag comparator compares the tag associated with the instruction in the fill buffer to the tag of the sought after address concurrently with the mapper mapping the instruction in the fill buffer into the predetermined instruction width format, and the selection circuit selects one of the mapped instructions or instruction held in the fill buffer for decoding, wherein the parallel mapper is disposed in the pipelined computer system upstream from the selection circuit, and wherein the parallel mapping, tag comparison, and selection are completed in a single pipeline stage.

* * * * *